US006997979B2

(12) United States Patent
Bauer et al.

(10) Patent No.: US 6,997,979 B2
(45) Date of Patent: *Feb. 14, 2006

(54) PIGMENT-BASED INKS FOR INK-JET PRINTING

(75) Inventors: Stephen W. Bauer, San Diego, CA (US); Zeying Ma, San Diego, CA (US)

(73) Assignee: Hewlett-Packard Development Company, L.P.

( * ) Notice: Subject to any disclaimer, the term of this patent is extended or adjusted under 35 U.S.C. 154(b) by 0 days.

This patent is subject to a terminal disclaimer.

(21) Appl. No.: 10/828,580

(22) Filed: Apr. 20, 2004

(65) Prior Publication Data

US 2005/0171239 A1 Aug. 4, 2005

Related U.S. Application Data

(63) Continuation-in-part of application No. 10/769,323, filed on Jan. 30, 2004.

(51) Int. Cl.
C09D 11/00 (2006.01)
C03C 17/00 (2006.01)
C08J 39/00 (2006.01)

(52) U.S. Cl. .................. 106/31.6; 523/160; 523/161; 523/200; 524/556

(58) Field of Classification Search .............. 106/31.6; 523/160, 161, 200; 524/556
See application file for complete search history.

(56) References Cited

U.S. PATENT DOCUMENTS

| 5,803,958 | A  | * | 9/1998  | Katsen et al. ............ 106/31.65 |
| 6,459,501 | B1 | * | 10/2002 | Holmes ....................... 358/1.9 |
| 6,565,202 | B2 | * | 5/2003  | Rose et al. ................. 347/100 |
| 6,726,758 | B2 | * | 4/2004  | Sano ........................ 106/31.6 |
| 6,767,090 | B2 | * | 7/2004  | Yatake et al. ............... 347/100 |
| 2002/0017219 | A1 |  | 2/2002 | Yamazaki et al. |

FOREIGN PATENT DOCUMENTS

EP  1 217 047  6/2002
GB  2 370 580  7/2002

OTHER PUBLICATIONS

Michael DiCosola, "Understanding Illuminants", X-Rite, Inc., Aug. 25, 1995.
"CIE Technical Report; Improvement to Industrial Colour-Difference Evaluation", CIE 142-2001, no month available.

* cited by examiner

Primary Examiner—J. A. Lorengo
Assistant Examiner—Veronica F. Faison

(57) ABSTRACT

A neutral gray or black ink and combinations thereof for ink-jet printing, comprising: an ink vehicle; carbon black; another colored pigment or pigments such as a combination of cyan and violet pigments; wherein the carbon black and colored pigments are associated with a polymer or polymers which render the carbon black and pigments dispersible in aqueous solution.

59 Claims, 4 Drawing Sheets

PIGMENT-BASED INKS FOR INK-JET PRINTING

The present application is a continuation-in-part application of and claims priority from application Ser. No. 10/769,323 filed Jan. 30, 2004.

FIELD OF THE INVENTION

The present invention relates to black and gray pigmented inks used to create neutral colors for ink-jet printing.

BACKGROUND OF THE INVENTION

To achieve true silver halide photo quality in inkjet printing, multiple levels of black inks need to be used. Within the black inks, light pigment load (gray ink) is necessary for reducing grain and dot visibility, and high pigment load is necessary for high optical density and high color gamut volume.

In photo printing, carbon black is usually the primary ingredient of black pigmented ink. One fundamental limitation with carbon black is "browning" which is the brownish undertone when it is used at low concentration as in a gray ink. This is especially true with the photo grade carbon black.

One way to treat the problems arising from the use of carbon black in black or gray inkjet ink has been to heavily use composite black throughout the color map. Composite black is conventionally the usage of mixtures of cyan, magenta and yellow inks to create neutral gray colors. Composite black has a known set of issues. Color cast/variations are often seen in shadows and fine lines due to drop weight variation, pen alignment and dot placement errors. Manufacturing variations in drop weight and ink lead to non-neutral black and white tones and color balance problems. This has in turn required closed loop color correction and/or extremely tight manufacturing tolerances.

Another way to deal with the problems of black and gray ink in inkjet has been to use four tones of gray inks. This provides the customer with different shades of black (e.g., warm neutral, cool neutral, selenium, and carbon sepia). However, these inks have not been suitable for glossy photo printing, because they do not stick to glossy paper and they do not provide gloss. A similar system has been produced with dye-based inks, which has had problems with non-permanence and color issues when printed on a range of media.

DETAILED DESCRIPTION OF EMBODIMENTS OF THE INVENTION

The present invention relates to gray ink-jet inks, specifically a set of two gray and one black inks, which when used alone, or in combinations of two or three of the inks, or in combination with conventional cyan, magenta and yellow (CMY), are neutral over a wide media range and illumination type. As non-limiting examples, these inks can be used in 3-ink gray-scale (black & white) printing, 6-ink printing, 8-ink printing and 12-ink printing systems. They provide excellent neutrality and reduced browning of carbon black and reduced metamerism of black pigments. Browning is the appearance of a brownish undertone in carbon black due to decreasing absorbtivity with longer wavelength light. Metamerism is the variation in visual response to color under varying illuminants resulting from the non-flat spectral reflectance produced by black and gray pigments. The present invention also significantly improves image quality, especially in shadow detail, open loop neutrality, granularity, and gloss uniformity. These neutral inks provide a solution for black and white printing with a color inkjet device.

To achieve true AgX photo quality, multiple levels of black inks should be used. Light pigment load (gray ink) is necessary for reducing grain and dot visibility, and high pigment load is necessary for high optical density and hence high color gamut volume. Additional levels of gray reduces the perceived grain in the transitions from a lighter to a darker ink.

Carbon black has been conventionally used for black and gray inks in such applications. One fundamental limitation with carbon black is the brownish undertone when it is used at low concentration as in a gray ink. This is especially true with the photo grade carbon black.

In the present invention, a pigment-blend approach is used to make the photo black and gray inks. Blending cyan and magenta or violet pigments into the carbon black at a defined absorbance ratio or at a certain weight percent range will allow the photo black, gray, and light gray inks to be perfectly neutral in shade on paper. In addition, the spectral response of the resultant black or gray ink is significantly flatter than the original straight diluted gray or black ink and has significantly reduced metamerism.

The present invention relates to a neutral blend black ink for ink-jet printing, comprising: an ink vehicle; carbon black (Ki), cyan pigment (Ci) and violet pigment (Vi)(or magenta pigment (Mi)). The absorptivity of Ki, Ci, Vi (or Mi), and Neutral i Spectra is measured between 350 nm and 750 nm wavelength. The Neutral i Spectrum of absorptivity approximates a horizontal line on a graph having a horizontal axis showing wavelength and a vertical axis showing absorptivity. The relationship between the pigments blended together to make the Neutral ink can be expressed as aKi Spectrum+bCi Spectrum+cVi (or cMi) Spectrum=Neutral i Spectrum where a, b and c are weight percentages of Ki, Ci and Vi (or Mi) in Neutral i and a+b+c=100%.

Figure 3:
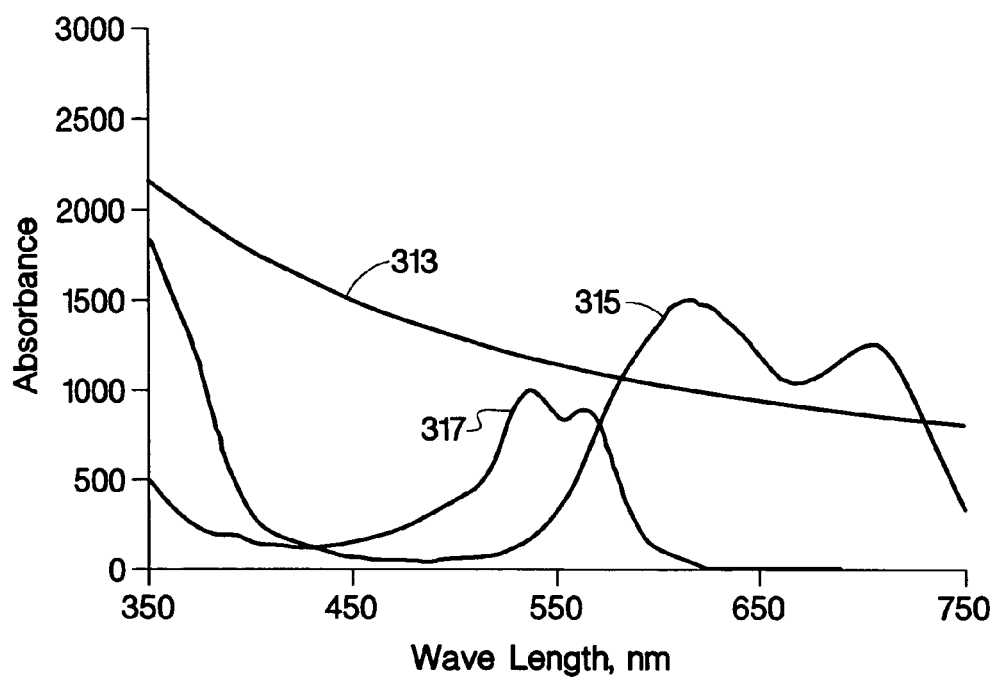
FIG. 3 shows an example of spectral reflectance curves of unblended carbon black and magenta and cyan pigments.
Figure 4:
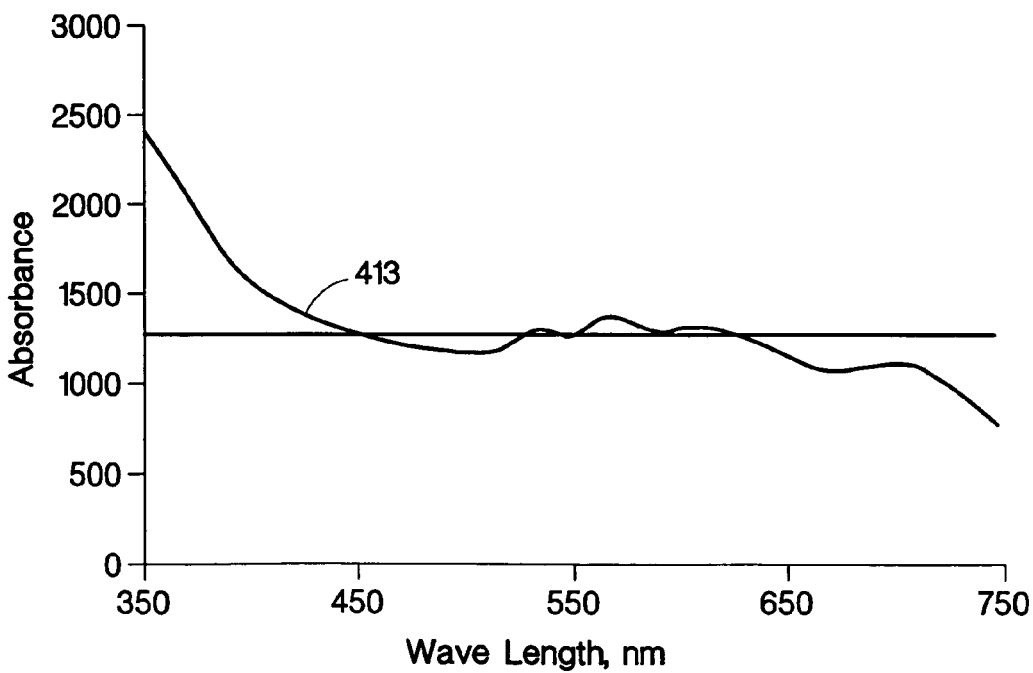
FIG. 4 shows a spectral reflectance curve of blended black pigment showing the desired flat spectral response for a midtone gray color patch of an embodiment of the present invention.

As explained in Example 2, the individual absorption spectra of K (carbon black), C (cyan pigment PB15:4) and M (magenta pigment PR122) were measured and compared as shown in FIG. 3. The K, C and M were then blended. The absorption spectrum for the blend is shown in FIG. 4. As can be seen, it is possible to achieve a neutral blend black inkjet ink having a neutral, flat absorption spectrum when either carbon black, cyan and magenta pigments, or carbon black, cyan and violet pigments are blended.

The present invention further relates to a neutral black ink for ink-jet printing, comprising: an ink vehicle; carbon black, cyan pigment and magenta pigment; wherein the absorbance ratio of carbon black:cyan pigment:magenta pigment for black ink is 0.18:0.08:0.05 with values being measured at 1/5K dilution, peak maxima at 400–700 wavelength and each ratio value ranging +/−25%.

The present invention also relates to a neutral black ink for ink-jet printing, comprising: an ink vehicle; carbon black, cyan pigment and violet pigment; wherein the absorbance ratio of carbon black:cyan pigment:violet pigment for black ink is 0.18:0.05:0.08 with values being measured at 1/5K dilution, peak maxima between 400–700 wavelength and each ratio value ranging +/−25%.

In another preferred embodiment of the present invention, the neutral black ink is printed together with a neutral medium gray ink, the neutral medium gray ink comprising: an ink vehicle; carbon black, cyan pigment and magenta pigment; wherein the absorbance ratio of carbon black:cyan pigment:magenta pigment for neutral medium gray ink is 0.04:0.02:0.01 with values being measured at 1/5K dilution, peak maxima between 400–700 wavelength and each ratio value ranging +/−25%.

In another preferred embodiment of the present invention, the neutral black ink is printed together with a neutral medium gray ink, the neutral medium gray ink comprising: an ink vehicle; carbon black, cyan pigment and violet pigment; wherein the absorbance ratio of carbon black:cyan pigment:violet pigment for neutral medium gray ink is 0.04:0.01:0.02 with values being measured at 1/5K dilution, peak maxima between 400–700 wavelength and each ratio value ranging +/−25%.

In still another preferred embodiment of the present invention, the neutral black ink is printed together with a neutral dark gray ink and a neutral light gray ink, the neutral dark gray ink comprising: an ink vehicle; carbon black, cyan pigment and magenta pigment; wherein the absorbance ratio of carbon black:cyan pigment:magenta pigment for neutral gray ink 0.06:0.03:0.02 with values being measured at 1/5K dilution, peak maxima between 400–700 wavelength and each ratio value ranging +/−25% and the neutral light gray ink comprising: an ink vehicle; carbon black, cyan pigment and magenta pigment; wherein the absorbance ratio of carbon black:cyan pigment:magenta pigment for neutral light gray ink is 0.02:0.01:0.01 with values being measured at 1/5K dilution, peak maxima between 400–700 wavelength and each ratio value ranging +/−25%.

In still another preferred embodiment of the present invention, the neutral black ink is printed together with a neutral dark gray ink and a neutral light gray ink, the neutral dark gray ink comprising: an ink vehicle; carbon black, cyan pigment and violet pigment; wherein the absorbance ratio of carbon black:cyan pigment:violet pigment for neutral gray ink 0.06:0.02:0.03 with values being measured at 1/5K dilution, peak maxima between 400–700 wavelength and each ratio value ranging +/−25% and the neutral light gray ink comprising: an ink vehicle; carbon black, cyan pigment and violet pigment; wherein the absorbance ratio of carbon black:cyan pigment:violet pigment for neutral light gray ink is 0.02:0.01:0.01 with values being measured at 1/5K dilution, peak maxima between 400–700 wavelength and each ratio value ranging +/−25%.

In a preferred embodiment of the present invention, the carbon black is selected from a group consisting of: FW18, FW2, FW1, FW200 (all manufactured by Degussa Inc.); Monarch 1100, Monarch 700, Monarch 800, Monarch 1000, Monarch 880, Monarch 1300, Monarch 1400, Regal 400R, Regal 330R, Regal 660R (all manufactured by Cabot Corporation); Raven 5750, Raven 250, Raven 5000, Raven 3500, Raven 1255, Raven 700 (all manufactured by Columbia Carbon, Inc.).

In a preferred embodiment of the present invention, the cyan pigment is a copper phthalocyanine pigment.

In a further preferred embodiment of the present invention, the cyan pigment is selected from the group consisting of PB15:3, PB 15:4, PB15:6, PB60, PB1, PB2, PB3, PB16, PB22, PB15:34. In a most preferred embodiment the cyan pigment is PB 15:3 or PB15:4.

In another preferred embodiment of the present invention, the violet pigment is a quinacridone pigment.

In a further preferred embodiment of the present invention, the magenta pigment is selected from the group consisting of PR122, PR192, PR202, PR206, PR207, PR209, PR43, PR194, PR112, PR123, PR168, PR184, PR5, PR7, PR12, PR48, PR57, PR57:1. In a most preferred embodiment of the present invention, the magenta pigment is PR122.

In another preferred embodiment of the present invention, the violet pigment has a quinacridone or dioxazine based structure.

In a further preferred embodiment of the present invention, the violet pigment is selected from the group consisting of PV19, PV42, PV23, PV3, PV19, PV23, PV32, PV36, and PV38. In a most preferred embodiment of the present invention, the violet pigment is PV23.

The present invention also relates to a neutral black ink for ink-jet printing, comprising: an ink vehicle; from 1.500 to 2.500 weight percent carbon black; from 0.638 to 1.063 weight percent PB15:4 cyan pigment; and from 0.780 to 1.300 weight percent PR122 magenta pigment.

The present invention also relates to a neutral black ink for ink-jet printing, comprising: an ink vehicle; from 1.568 to 2.613 weight percent carbon black; from 0.317 to 0.529 weight percent PB15:4 cyan pigment; and from 0.438 to 0.731 weight percent PV23 violet pigment.

In a preferred embodiment of the present invention, the neutral black ink is printed together with a neutral medium gray ink, the neutral medium gray ink comprising: an ink vehicle; from 0.375 to 0.625 weight percent carbon black; from 0.152 to 0.253 weight percent PB15:4 cyan pigment; and from 0.203 to 0.339 weight percent PR122 magenta pigment.

In a preferred embodiment of the present invention, the neutral black ink is printed together with a neutral medium gray ink, the neutral medium gray ink comprising: an ink vehicle; from 0.314 to 0.523 weight percent carbon black; from 0.068 to 0.113 weight percent PB15:4 cyan pigment; and from 0.101 to 0.169 weight percent PV23 violet pigment.

In another preferred embodiment of the present invention, the neutral black ink is printed together with a neutral dark gray ink and a neutral light gray ink, the neutral dark gray ink comprising: an ink vehicle; from 0.495 to 0.825 weight percent carbon black; from 0.210 to 0.351 weight percent PB15:4 cyan pigment; and from 0.257 to 0.429 weight percent PR122 magenta pigment; and the neutral light gray ink comprising: an ink vehicle; from 0.165 to 0.275 weight percent carbon black; from 0.070 to 0.117 weight percent PB15:4 cyan pigment; and from PR122 0.086 to 0.143 weight percent magenta pigment.

In another preferred embodiment of the present invention, the neutral black ink is printed together with a neutral dark gray ink and a neutral light gray ink, the neutral dark gray ink comprising: an ink vehicle; from 0.517 to 0.862 weight percent carbon black; from 0.105 to 0.174 weight percent PB15:4 cyan pigment; and from 0.145 to 0.241 weight percent PV23 violet pigment; and the neutral light gray ink comprising: an ink vehicle; from 0.172 to 0.287 weight percent carbon black; from 0.035 to 0.058 weight percent PB15:4 cyan pigment; and from 0.048 to 0.80 weight percent PV23 violet pigment.

When pigmented inks are used, three different blacks are often used: at least two for photo printing (photo black and gray) and one for plain paper application (matte black). Photo black is black ink that is ink-jet printed with maximum effectiveness on photo paper having a glossy surface. Photo black ink has carbon black pigments of a smaller size that matte black, thus making it effective when printed on glossy paper. Matte black ink is black ink that is ink-jet printed with maximum effectiveness on plain paper or photo paper with a matte surface. Matte black ink has larger sized carbon black pigments which enhance its effectiveness for printing on plain paper or photo paper with a matte surface.

As non-limiting examples, the neutral inks of the present invention can be used in a 3-ink, 6-ink, 8-ink, or 12-ink ink set.

An example of a three-ink ink set is as follows:

For photo printing: Neutral black, neutral dark gray and neutral light gray.

For plain paper: Neutral black, neutral dark gray and matte black.

An example of a 6-ink ink set is as follows:

For photo printing: Neutral black, neutral dark gray, neutral light gray, cyan, magenta (or violet), and yellow.

For plain paper: Neutral black, neutral dark gray, matte black, cyan, magenta (or violet), and yellow.

An example of an 8-ink ink set is as follows:

For photo printing: Neutral black, neutral dark gray, neutral light gray, cyan, light cyan, magenta (or violet), light magenta (or light violet), and yellow.

For plain paper: Neutral black, neutral dark gray, matte black, cyan, light cyan, magenta (or violet), light magenta (or light violet), and yellow.

An example of a 12-ink ink set is as follows:

For photo printing: Neutral black, neutral light gray, cyan, light cyan, magenta, light magenta (or light violet), yellow, red, green, blue, violet and orange.

For plain paper: Neutral black, matte black, cyan, light cyan, magenta, light magenta (or light violet), yellow, red, green, blue, violet and orange.

Another example for plain paper: Neutral black, matte black, neutral gray, neutral light gray, cyan, magenta, light magenta (or light violet), yellow, orange, violet, green and gloss optimizer.

While blending dyes is a common practice in the inkjet industry, blending pigments is rare and made difficult by particle colloidal stability, but has been achieved in the present invention with pigments that in addition provide high gloss and durability on glossy surfaces. The pigments of the present invention are blended together and made dispersible in aqueous solutions using polymers and specific dispersion systems that are known. As a non-limiting example of one type of such dispersion system, the surface of a pigment and/or carbon black is attached to or associated with a polymer or polymers. Such systems have been described in the following patents or patent applications: U.S. Pat. Nos. 6,506,240, 6,648,953, and U.S. Patent Application No. 2001/0035110 (all assigned to Seiko Epson Corporation); U.S. Pat. No. 6,494,943 and U.S. Patent Application Nos. 2003/0205171 and 2002/0005146 (all assigned to Cabot Corporation); and U.S. Pat. No. 6,555,614 (assigned to Dainippon Ink and Chemicals, Inc.), such descriptions of which are incorporated herein by reference. As a non-limiting example of another type of such dispersion system, the pigment and/or carbon black is encapsulated by a polymer or polymers. Such systems have been described in the following patents or patent applications: U.S. Pat. Nos. 6,074,467, 5,741,591, 5,556,583, 4,740,546, and 4,170,582 (all assigned to Dainippon Ink and Chemicals, Inc.); and U.S. Patent Application No. 2003/0195274 (assigned to Seiko Epson Corporation).

In a preferred embodiment of a dispersion system used in the present invention, the polymer or polymers associated with the surface of a pigment and/or carbon black is an acrylate.

In addition to providing perfect neutrality, reduced browning, and the least metamerism reasonably possible, the blend black and gray inks of the present invention provide a solution for out-of-box black and white printing. The present invention also provides cost saving for printers on closed-loop color calibration. Furthermore, the blended inks significantly improve image qualities, especially in shadow detail and granularity as well as in gloss uniformity. Using blended inks instead of KCMY composite also reduces total ink flux on paper.

EXAMPLES

Example 1

A neutral medium gray ink was comprised of a blend of carbon black (0.5 weight percent), cyan pigment (0.202 weight percent PB 15:4), and magenta pigment (0.271 weight percent PR122) together with vehicle. The color of the neutral medium gray ink blend, the dots designated as 213 on the color map, was tested and the result was plotted on a color map shown in FIG. 2.

Figure 1:
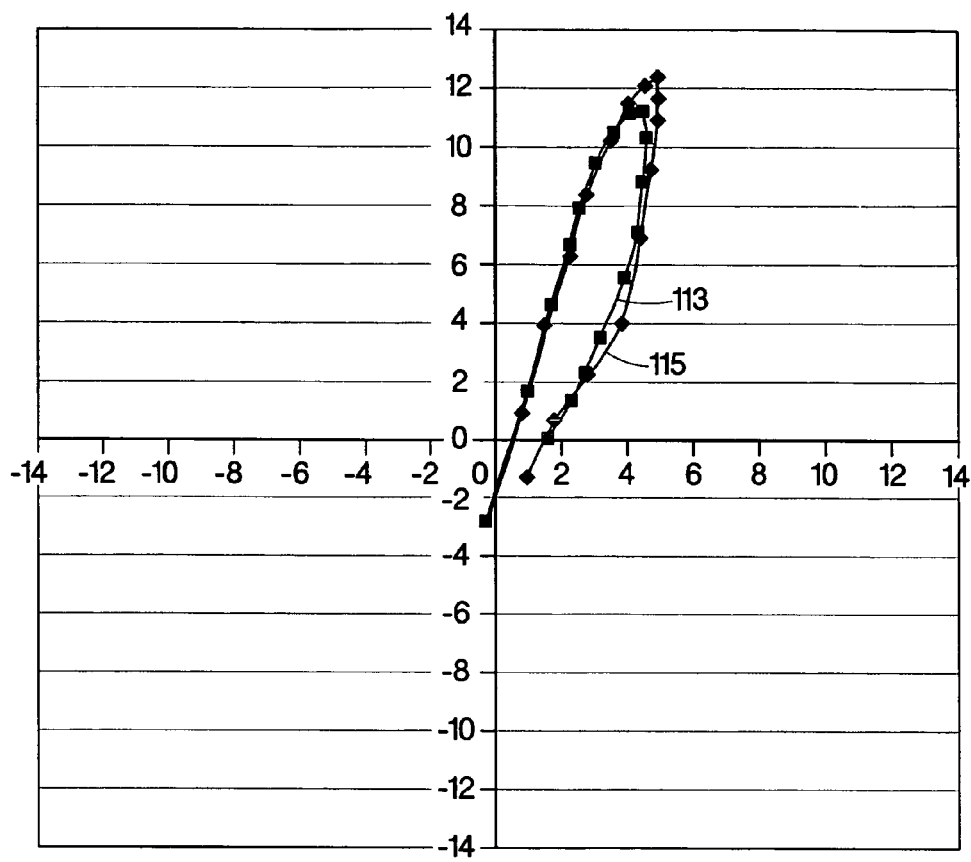
FIG. 1 is a graph in a*b* colorspace showing the browning of two gray inks made of pure carbon black.

As a comparative example, FIG. 1 shows the browning of two conventional gray inks, 113 and 115, on a color map. The two gray inks, 113 and 115, were made of pure carbon black. 113 is Epson 2200 Gray and 115 is 1% wt. BP1100. This graph represents the change in the color of the patches as the patches increase in volumes of ink per unit area.

Figure 2:
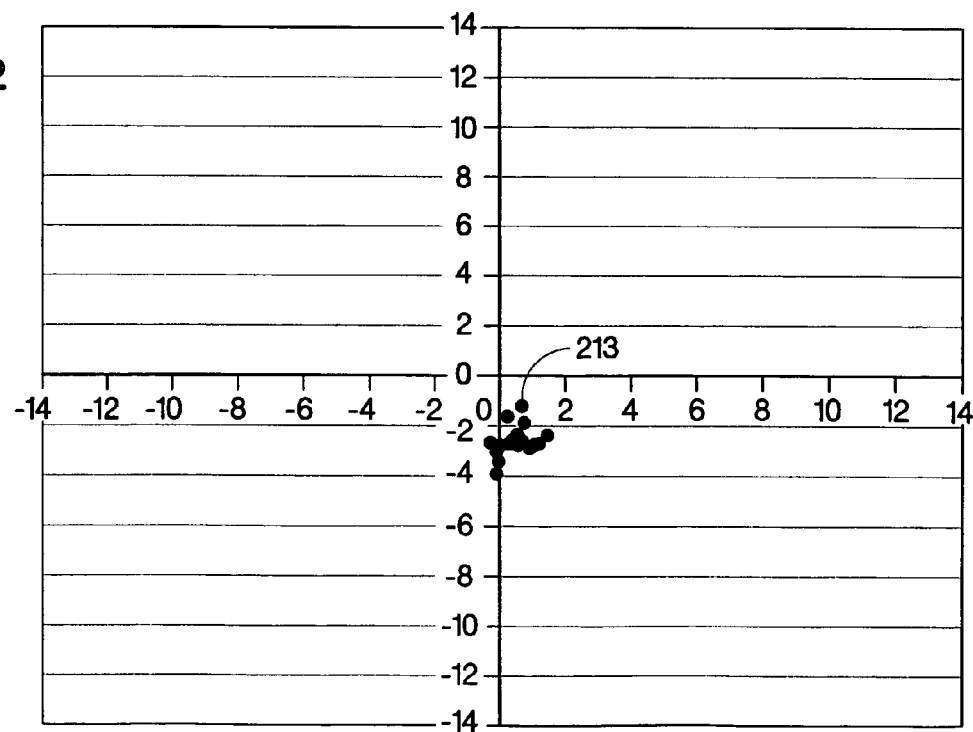
FIG. 2 is a graph in a*b* colorspace showing the neutrality of a blended neutral gray ink in an embodiment of the present invention.

FIG. 2 shows the neutrality of the neutral medium gray ink made as described above. Alternatively, the blend of the present invention can be made to achieve any $L^*$ value to satisfy the specific demands of the color map. A broad mixing ratio range in the blend of the present invention can be covered laterally in the "a" and "b" plane of the map and also along the $L^*$ axis.

Example 2

The individual absorption spectra of K (carbon black) (designated as 313), C (cyan pigment PB15:4) (designated as 315) and M (magenta pigment PR122) (designated as 317) were measured and compared as shown in FIG. 3. The K, C and M were then blended to achieve a neutral black ink. In blending the K, C and M, the goal was to make the absorption spectra as flat as possible. The absorption spectrum, designated as 413, for the blend is shown in FIG. 4. It has been found that the absorption spectra of the blend approximates a flat line on the absorptivity chart such as the approximate horizontal line shown in FIG. 4. This is achieved when the individual absorptivities of K, C, and M from 350 nm to 750 nm (as shown in FIG. 3) can be combined to achieve a neutral blend black ink having an absorptivity which approximates a horizontal absorptivity line from 350 nm to 750 nm. The amounts of K, C, and M needed to be combined in order to achieve the neutral blend having absorptivity approximating a horizontal line can be determined by the equation $a+b+c=100\%$, where a, b, and c are respectively the weight percentage amounts of K, C, and M. A neutral blend black ink can be achieved under similar conditions when violet pigment is substituted for magenta pigment.

Example 3

Figure 5:
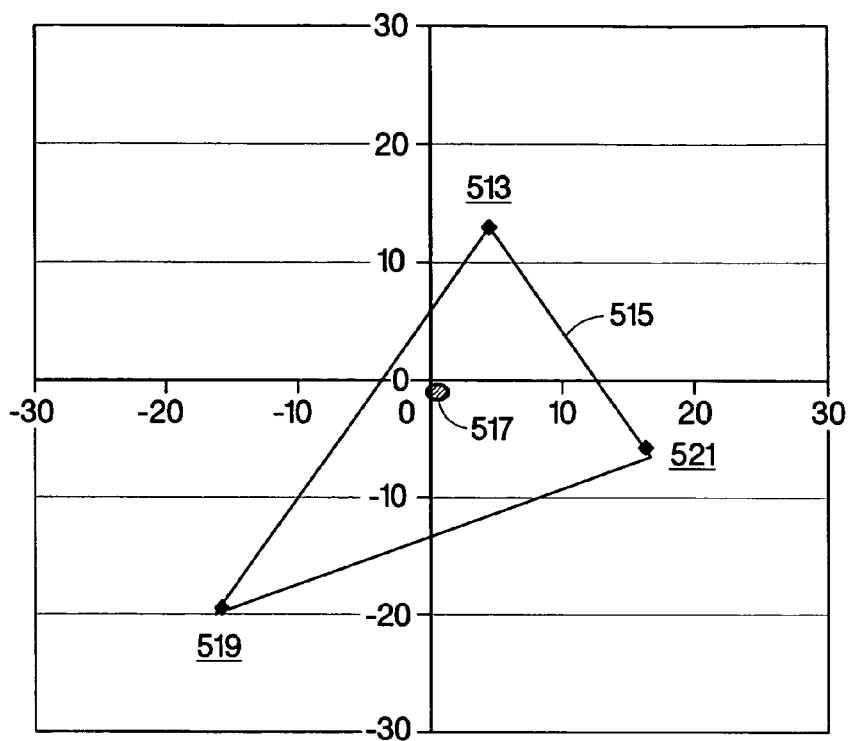
FIG. 5 is a graph in a*b* colorspace showing the target point of the blend (an embodiment of the present invention) of K (carbon black), C (cyan pigment) and M (magenta pigment) versus the position of the points of the individual, unblended K, C and M.

A graph, as shown in FIG. 5, was plotted in $a^*b^*$ colorspace to show the target area of the blend of K (carbon black)(the point 513), C (cyan pigment PB15:4) (the point 519) and M (magenta pigment PR122) (the point 521) versus the position of the points (K=513; C=519; M=521) of the individual, unblended K, C and M. From the points of the unblended K, C and M was defined a triangle (the perimeter of which is marked 515) within which was the target (the middle of the target indicated as 517) for the neutral blended K, C and M points.

Example 4

Blends of K, C (PB15:4) and M (PR122) were measured for neutrality based on the $a^*b^*$ colorspace criteria discussed in Example 5. Each blend was identified in terms of both weight percentage composition and absorbance ratio composition. The most neutral blends for two-color print combinations neutral black (photo black) and neutral medium gray and three-color print combinations (neutral black (photo black), neutral dark gray, and neutral light gray) were both obtained. The upper limits and lower limits of the amount of each pigment in the blends was also calculated based on taking +/−25% of the measured center of neutrality for each blend. The values were measured at 1/5K dilution, peak maxima between 400–700 wavelength. The data resulting from the measurements are given below in Tables 1 and 2, which give the data for the two-color and three-color print combinations respectively. In the $L^*a^*b^*$ colorspace, $a^*=0$, and $b^*=2$. Since the lowest $L^*$ possible was desired, $L^*$ was taken to be less than 5. Carbon black usage was maximized wherever possible.

TABLE 1

| | Two levels of black | | | | | |
|---|---|---|---|---|---|---|
| | % Pigment in ink | | | Absorbance @ 1/5K dilution | | |
| | K | C | M | K | C | M |
| Neutral Black (Photo Black) | 2 | 0.85 | 1.04 | 0.176 | 0.075 | 0.052 |
| Neutral Medium Gray | 0.5 | 0.202 | 0.271 | 0.035 | 0.016 | 0.012 |

| | | | | Wavelength (nm) | | |
|---|---|---|---|---|---|---|
| | | | | | peak maxima between | peak maxima between |
| | | | | Generally: 500 Preferred embodiment: 500 | 400–700 615 | 400–700 535 |

These are the centers, +/−25% would give a range of each pigment concentration.

| | upper limit | | | | | |
|---|---|---|---|---|---|---|
| | % Pigment in ink | | | Absorbance @ 1/5K dilution | | |
| | K | C | M | K | C | M |
| Neutral Black (Photo Black) | 2.500 | 1.063 | 1.300 | 0.219 | 0.094 | 0.066 |
| Neutral Medium Gray | 0.625 | 0.253 | 0.339 | 0.044 | 0.020 | 0.015 |

| | | | | Wavelength (nm) | | |
|---|---|---|---|---|---|---|
| | | | | | peak maxima between | peak maxima between |
| | | | | Generally: 500 Preferred embodiment: 500 | 400–700 615 | 400–700 535 |

TABLE 1-continued

| | lower limit | | | | | |
|---|---|---|---|---|---|---|
| | % Pigment in ink | | | Absorbance @ 1/5K dilution | | |
| | K | C | M | K | C | M |
| Neutral Black (Photo Black) | 1.500 | 0.638 | 0.780 | 0.132 | 0.057 | 0.039 |
| Neutral Medium Gray | 0.375 | 0.152 | 0.203 | 0.026 | 0.012 | 0.009 |

| Wavelength (nm) | | |
|---|---|---|
| | peak maxima between | peak maxima between |
| Generally: 500 | 400–700 | 400–700 |
| Preferred embodiment: 500 | 615 | 535 |

TABLE 2

Three levels of black

| | % Pigment in ink | | | Absorbance @ 1/5K dilution | | |
|---|---|---|---|---|---|---|
| | K | C | M | K | C | M |
| Neutral Black (Photo Black) | 2 | 0.85 | 1.04 | 0.176 | 0.075 | 0.052 |
| Neutral Dark Gray | 0.660 | 0.281 | 0.343 | 0.058 | 0.025 | 0.017 |
| Neutral Light Gray | 0.220 | 0.094 | 0.114 | 0.019 | 0.008 | 0.006 |

| Wavelength (nm) | | |
|---|---|---|
| | peak maxima between | peak maxima between |
| Generally: 500 | 400–700 | 400–700 |
| Preferred Embodiment: 500 | 615 | 535 |

These are the centers, +/−25% would give a range of each pigment concentration.

| | upper limit | | | | | |
|---|---|---|---|---|---|---|
| | % Pigment in ink | | | Absorbance @ 1/5K dilution | | |
| | K | C | M | K | C | M |
| Neutral Black (Photo Black) | 2.500 | 1.063 | 1.300 | 0.219 | 0.094 | 0.066 |
| Neutral Dark Gray | 0.825 | 0.351 | 0.429 | 0.072 | 0.031 | 0.022 |
| Neutral Light Gray | 0.275 | 0.117 | 0.143 | 0.024 | 0.010 | 0.007 |

TABLE 2-continued

| Wavelength (nm) | | |
|---|---|---|
| | peak maxima between | peak maxima between |
| Generally: 500 | 400–700 | 400–700 |
| Preferred Embodiment: 500 | 615 | 535 |

| | lower limit | | | | | |
|---|---|---|---|---|---|---|
| | % Pigment in ink | | | Absorbance @ 1/5K dilution | | |
| | K | C | M | K | C | M |
| Neutral Black (Photo Black) | 1.500 | 0.638 | 0.780 | 0.132 | 0.057 | 0.039 |
| Neutral Dark Gray | 0.495 | 0.210 | 0.257 | 0.043 | 0.019 | 0.013 |
| Neutral Light Gray | 0.165 | 0.070 | 0.086 | 0.014 | 0.006 | 0.004 |

| Wavelength (nm) | | |
|---|---|---|
| | peak maxima between | peak maxima between |
| Generally: 500 | 400–700 | 400–700 |
| Preferred Embodiment: 500 | 615 | 535 |

Figure 6:
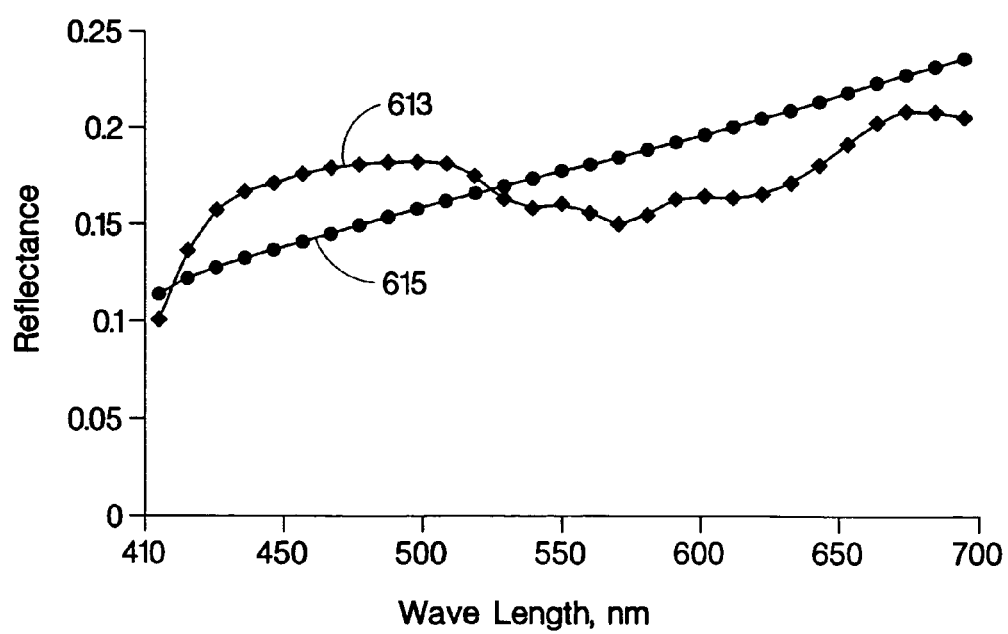
FIG. 6 is a graph plotting the reflectance vs. wavelength of light shown on ink-jet printed samples of two inks, a neutral gray (an embodiment of the present invention) and a diluted black.

FIG. 6 plots the reflectance vs. wavelength of light shown on ink-jet printed samples of two inks. One of the inks was a diluted, carbon black-based, black ink (designated as 615) and the other was the preferred embodiment of the present application, a neutral dark gray ink blending carbon black with magenta (PR122) and cyan (PB15:4) pigments and dispersed with a polymer according to the present invention (designated as 613). Based on these values shown in FIG. 6, a ΔE value of 1.58 was obtained for the diluted black ink, compared to a ΔE value of 0.64 for the neutral dark gray ink. ΔE is designed to give a quantitative representation of a perceived color difference between a pair of colored samples. ΔE was calculated using the CIEDE2000 color difference equation (set out in CIE Technical Report ISBN 3 901 906 08 8, CIE142-2001, incorporated herein by reference). Metamerism can be measured in terms of ΔE based on the fact that metamerism is the difference in colors which match each other under one set of light conditions but do not match each other when viewed under another set of light conditions. Specifically, the spectral data was converted into L*a*b* measurements assuming D50 (representing daylight at 5000 degrees Kelvin) and then F11 (representing a broad bright daylight fluorescent source) illuminants and the ΔE between the two values was computed with the aforementioned CIEDE2000 equation. As a measurement of metamerism, a ΔE value of 1 for grays and blacks represents roughly a just barely noticeable difference in color to a naked human eye. Therefore, the above data as embodied in FIG. 6 demonstrate that the gray ink of the present invention has less metamerism than a conventional black ink.

Example 6

Blends of K, C (PB15:4) and V(PV23) were measured for neutrality based on the L*a*b* colorspace criteria discussed in Example 5. Each blend was identified in terms of both weight percentage composition and absorbance ratio composition. The most neutral blends for two-color print combinations neutral black (photo black) and neutral medium gray and three-color print combinations (neutral black (photo black), neutral dark gray, and neutral light gray) were both obtained. The upper limits and lower limits of the amount of each pigment in the blends was also calculated based on taking +/−25% of the measured center of neutrality for each blend. The values were measured at 1/5K dilution, peak maxima between 400–700 wavelength. The data resulting from the measurements are given below in Tables 3 and 4, which give the data for the two-color and three-color print combinations respectively. For the L*a*b* colorspace, a=0, and b=2. Since the lowest L* possible was desired, L* was taken to be less than 5. Carbon black usage was maximized wherever possible.

TABLE 3

Two levels of black

| | % Pigment in ink | | | Absorbance @ 1/5K dilution | | |
|---|---|---|---|---|---|---|
| | K | C | V | K | C | V |
| Neutral Black (Photo Black) | 2.090 | 0.423 | 0.585 | 0.182 | 0.047 | 0.083 |
| Neutral Medium Gray | 0.418 | 0.090 | 0.135 | 0.036 | 0.010 | 0.019 |

| | Wavelength (nm) | |
|---|---|---|
| | peak maxima between | peak maxima between |
| Generally: 500 | 400–700 | 400–700 |
| Preferred | 615 | 535 |
| Embodiment: 500 | | |

These are the centers, +/−25% would give a range of each pigment concentration.

upper limit

| | % Pigment in ink | | | Absorbance @ 1/5K dilution | | |
|---|---|---|---|---|---|---|
| | K | C | V | K | C | V |
| Neutral Black (Photo Black) | 2.613 | 0.529 | 0.731 | 0.227 | 0.059 | 0.104 |
| Neutral Medium Gray | 0.523 | 0.113 | 0.169 | 0.045 | 0.012 | 0.024 |

| | Wavelength (nm) | |
|---|---|---|
| | peak maxima between | peak maxima between |
| Generally: 500 | 400–700 | 400–700 |
| Preferred | 615 | 535 |
| Embodiment: 500 | | |

TABLE 3-continued lower limit

| | % Pigment in ink | | | Absorbance @ 1/5K dilution | | |
|---|---|---|---|---|---|---|
| | K | C | V | K | C | V |
| Neutral Black (Photo Black) | 1.568 | 0.317 | 0.438 | 0.136 | 0.035 | 0.062 |
| Neutral Medium Gray | 0.314 | 0.068 | 0.101 | 0.027 | 0.007 | 0.014 |

| | Wavelength (nm) | |
|---|---|---|
| | peak maxima between | peak maxima between |
| Generally: 500 | 400–700 | 400–700 |
| Preferred | 615 | 535 |
| Embodiment: 500 | | |

TABLE 4

Three levels of black

| | % Pigment in ink | | | Absorbance @ 1/5K dilution | | |
|---|---|---|---|---|---|---|
| | K | C | M | K | C | M |
| Neutral Black (Photo Black) | 2.090 | 0.423 | 0.585 | 0.182 | 0.047 | 0.083 |
| Neutral Dark Gray | 0.690 | 0.140 | 0.193 | 0.060 | 0.015 | 0.027 |
| Neutral Light Gray | 0.230 | 0.047 | 0.064 | 0.020 | 0.005 | 0.009 |

| | Wavelength (nm) | |
|---|---|---|
| | peak maxima between | peak maxima between |
| Generally: 500 | 400–700 | 400–700 |
| Preferred | 615 | 535 |
| Embodiment: 500 | | |

These are the centers, +/−25% would give a range of each pigment concentration.

upper limit

| | % Pigment in ink | | | Absorbance @ 1/5K dilution | | |
|---|---|---|---|---|---|---|
| | K | C | M | K | C | M |
| Neutral Black (Photo Black) | 2.613 | 0.529 | 0.731 | 0.227 | 0.059 | 0.104 |
| Neutral Dark Gray | 0.862 | 0.174 | 0.241 | 0.075 | 0.019 | 0.034 |
| Neutral Light Gray | 0.287 | 0.058 | 0.080 | 0.025 | 0.006 | 0.011 |

TABLE 4-continued

| | | | | Wavelength (nm) | |
| --- | --- | --- | --- | --- | --- |
| | | | | peak maxima between | peak maxima between |
| | | | Generally: 500 Preferred Embodiment: 500 | 400–700 615 | 400–700 535 |

| | | | | lower limit | |
| --- | --- | --- | --- | --- | --- |
| | % Pigment in ink | | | Absorbance @ 1/5K dilution | |
| | K | C | M | K | C | M |
| Neutral Black (Photo Black) | 1.568 | 0.317 | 0.438 | 0.136 | 0.035 | 0.062 |
| Neutral Dark Gray | 0.517 | 0.105 | 0.145 | 0.045 | 0.012 | 0.021 |
| Neutral Light Gray | 0.172 | 0.035 | 0.048 | 0.015 | 0.004 | 0.007 |

| | | | | Wavelength (nm) | |
| --- | --- | --- | --- | --- | --- |
| | | | | peak maxima between | peak maxima between |
| | | | Generally: 500 Preferred Embodiment: 500 | 400–700 615 | 400–700 535 |

Example 7

Figure 7:
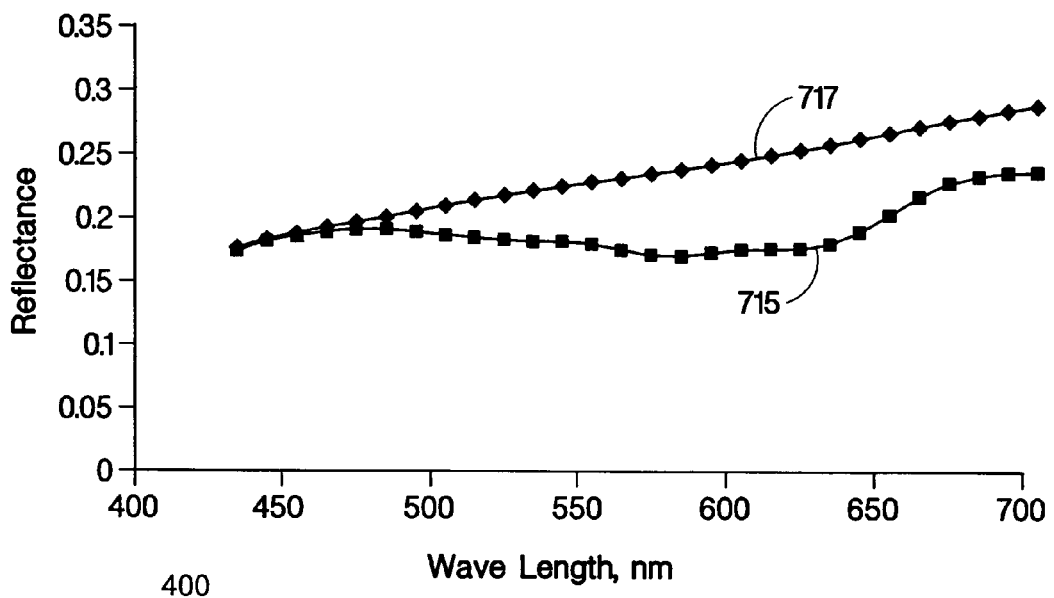
FIG. 7 is a graph in a*b* colorspace showing the neutrality of a blended neutral gray ink (an embodiment of the present invention).

FIG. 7 plots the reflectance vs. wavelength of light shown on ink-jet printed samples of two inks. One of the inks was a diluted, carbon black-based, black ink (designated as 717) and the other was the preferred embodiment of the present application, a neutral dark gray ink blending carbon black with violet (PV23) and cyan (PB15:4) pigments and dispersed with a polymer according to the present invention (designated as 715). This mixture provides that a*=0.1 and b*=0.7 under D50 light conditions. Based on these values shown in FIG. 7, it was determined that the optimal mixture for this combination of pigments was: 37.2 parts light gray; 2.7 parts light cyan and 1 part violet. Specifically, the spectral data was converted into L*a*b* measurements assuming D50 (representing daylight at 5000 degrees Kelvin). Therefore, the above data as embodied in FIG. 8 demonstrate that the gray ink of the present invention has noticeably less browning than a conventional black ink.

Example 8

Various proportions of a blend of carbon black, violet and cyan used to achieve a neutral medium gray ink were tested and the results were plotted as dots designated as 813 (neutrality target), 815 (pure black), 818 (in-creasing violet), 819 (increasing cyan), and 821 (maximum cyan and violet) on the color map. The map is shown in FIG. 8.

Figure 8:
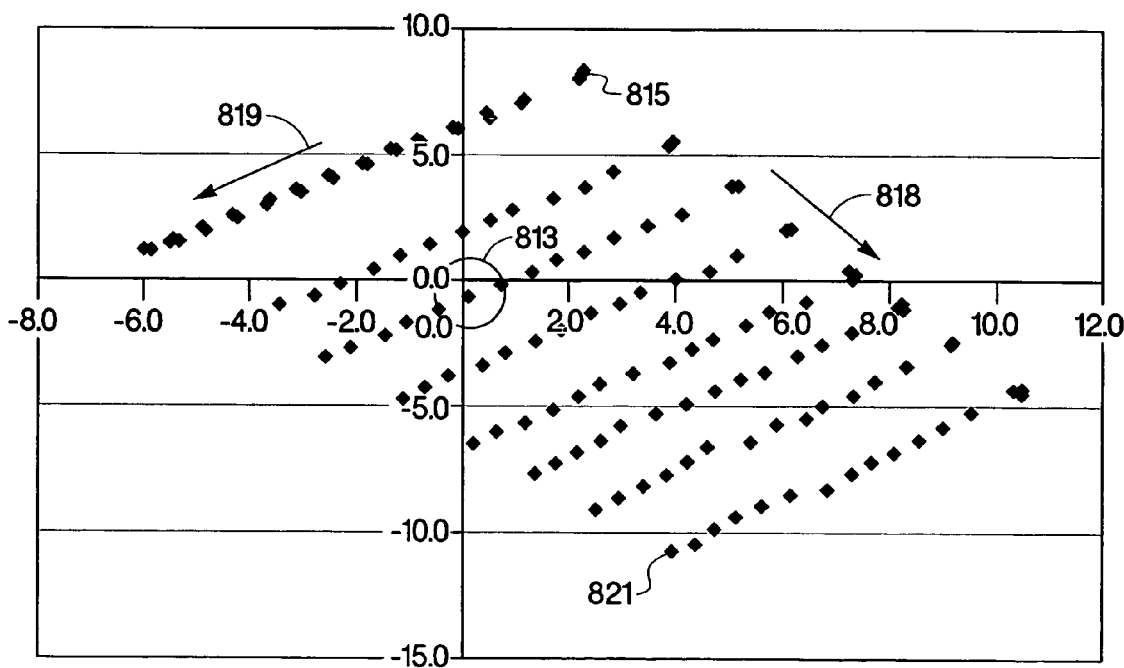
FIG. 8 is a graph plotting the reflectance vs. wavelength of light shown on ink-jet printed samples of two inks, an ink having a mixture of carbon black, cyan and violet and an ink having only carbon black.

FIG. 8 shows the positions of the various blends of carbon black, cyan and violet of the neutral medium gray ink as dots on the color map. With carbon black alone, the dots (815) congregated near the top slightly to the right on the a* axis. As cyan was added to the carbon black, the dots (819) tended to shift in a diagonal NE to SW direction on the map. As violet was added to the carbon black, the dots 818 tended to shift diagonally NW to SE. As an optimal blend is reached the position of the dots (813) on the map is close to 0.0, the neutrality target. As maximum cyan and violet were added, the dots (821) shifted to the bottom of the map.

What is claimed is:

1. A neutral black ink for ink-jet printing, comprising:
an ink vehicle; carbon black, cyan pigment and violet pigment; wherein the absorbance ratio of carbon black: cyan pigment: violet pigment for black ink is 0.18:0.05: 0.08 with values being measured at 1/5K dilution, at the peak maxima between 400 nm and 700 nm wavelength for cyan and violet and at 500 nm for carbon black and each ratio value ranging +/−25%;
and wherein the carbon black, cyan pigment and violet pigment are associated with a polymer or polymers which render the carbon black, cyan pigment and violet pigment dispersible in aqueous solution.

2. The neutral black ink of claim 1 wherein the wavelength of the peak maxima for the cyan of the neutral black ink is 610 to 620 nm.

3. The neutral black ink of claim 1 wherein the wavelength of the peak maxima for the violet of the neutral black ink is 530 to 540 nm.

4. The neutral black ink of claim 1, wherein the polymer or polymers comprise acrylates.

5. The neutral black ink of claim 1, wherein the neutral black ink is printed together with a neutral medium gray ink, the neutral medium gray ink comprising:
an ink vehicle; carbon black, cyan pigment and violet pigment; wherein the absorbance ratio of carbon black: cyan pigment: violet pigment for neutral medium gray ink is 0.04:0.01:0.02 with values being measured at 1/5K dilution, at the peak maxima between 400 nm and 700 nm wavelength for cyan and violet and at 500 nm for carbon black and each ratio value ranging +/−25%.

6. The neutral black ink of claim 5 wherein the wavelength of the peak maxima for the cyan of the neutral medium gray ink is 610 to 620 nm.

7. The neutral black ink of claim 5 wherein the wavelength of the peak maxima for the violet of the neutral medium gray ink is 530 to 540 nm.

8. The neutral black ink of claim 1, wherein the neutral black ink is printed together with a neutral dark gray ink and a neutral light gray ink, the neutral dark gray ink comprising:
an ink vehicle; carbon black, cyan pigment and violet pigment; wherein the absorbance ratio of carbon black: cyan pigment: violet pigment for neutral dark gray ink is 0.06:0.02:0.03 with values being measured at 1/5K dilution, at the peak maxima between 400 nm and 700 nm wavelength for cyan and violet and at 500 nm for carbon black and each ratio value ranging +/−25%
and the neutral light gray ink comprising:
an ink vehicle; carbon black, cyan pigment and violet pigment; wherein the absorbance ratio of carbon black: cyan pigment: violet pigment for neutral light gray ink is 0.02:0.01:0.01 with values being measured at 1/5K dilution, at the peak maxima between 400 nm and 700 nm wavelength for cyan and violet and at 500 nm for carbon black and each ratio value ranging +/−25%.

9. The neutral black ink of claim 8 wherein the wavelength of the peak maxima for the cyan of the neutral dark gray ink is 610 to 620 nm.

10. The neutral black ink of claim 8 wherein the wavelength of the peak maxima for the violet of the neutral dark gray ink is 530 to 540 nm.

11. The neutral black ink of claim 8 wherein the wavelength of the peak maxima for the cyan of the neutral light gray ink is 610 to 620 nm.

12. The neutral black ink of claim 8 wherein the wavelength of the peak maxima for the violet of the neutral light gray ink is 530 to 540 nm.

13. The neutral black ink of claim 1, wherein the violet pigment is selected from the group consisting of PV19, PV42, PV23, PV3, PV32, PV36, and PV38.

14. The neutral black ink of claim 1, wherein the violet pigment has a quinacridone or dioxazine based structure.

15. The neutral black ink of claim 1,
wherein the carbon black in the neutral black ink is from 1.568 to 2.613 weight percent; the cyan pigment is from 0.317 to 0.529 weight percent and comprises PB15:4 cyan pigment; and the violet pigment is from 0.438 to 0.731 weight percent and comprises violet pigment.

16. The neutral black ink of claim 5, wherein the carbon black in the neutral medium gray ink is from 0.314 to 0.523 weight percent carbon black; the cyan pigment in the neutral medium gray ink is from 0.068 to 0.113 weight percent and comprises PB15:4 cyan pigment; and the violet pigment in the neutral medium gray ink is from 0.101 to 0.169 weight percent and comprises PV23 violet pigment.

17. The neutral black ink of claim 8, wherein the carbon black in the neutral dark gray ink is from 0.517 to 0.862 weight percent carbon black; the cyan pigment in the neutral dark gray ink is from 0.105 to 0.174 weight percent cent and comprises PB15:4 cyan pigment; and the violet pigment in the neutral dark gray ink is from 0.145 to 0.241 weight percent and comprises violet pigment; and wherein the carbon black in the neutral light gray ink is from 0.172 to 0.287 weight percent carbon black; the cyan pigment in the neutral light gray ink is from 0.035 to 0.058 weight percent and comprise cyan pigment; and the violet pigment in the neutral light gray ink is from 0.048 to 0.080 weight percent and comprises PV23 violet pigment.

18. An ink set for ink-jet printing, comprising an ink set of a neutral black ink and at least one ink selected from the group consisting of neutral medium gray ink, neutral dark gray ink, neutral light gray ink, cyan ink, magenta ink, yellow ink, light cyan ink, light magenta ink, red ink, green ink, blue ink, violet ink and orange ink;
wherein the absorbance ratio of carbon black: cyan pigment: violet pigment for neutral black ink is 0.18:0.05:0.08 with values being measured at 1/5K dilution, at the peak maxima between 400 nm and 700 nm wavelength for cyan and violet and at 500 nm for carbon black and each ratio value ranging +/−25%;
and wherein the carbon black, cyan pigment and violet pigment are associated with a polymer or polymers which render the carbon black, cyan pigment and violet pigment dispersible in aqueous solution.

19. The ink set of claim 18 wherein the wavelength of the peak maxima for the cyan of the neutral black ink is 610 to 620 nm.

20. The ink set of claim 18 wherein the wavelength of the peak maxima for the violet of the neutral black ink is 530 to 540 nm.

21. The ink set of claim 18, wherein the polymer or polymers comprise acrylates.

22. The ink set of claim 18, wherein when the ink-set comprises neutral medium gray ink, the absorbance ratio of carbon black: cyan pigment: violet pigment for the neutral medium gray ink is 0.04:0.01:0.02 with values being measured at 1/5K dilution, at the peak maxima between 400 nm and 700 nm wavelength for cyan and violet and at 500 nm for carbon black and each ratio value ranging +/−25%.

23. The ink set of claim 22 wherein the wavelength of the peak maxima for the cyan of the neutral medium gray ink is 610 to 620 nm.

24. The ink set of claim 22 wherein the wavelength of the peak maxima for the violet of the neutral medium gray ink is 530 to 540 nm.

25. The ink set of claim 18, wherein when the ink-set comprises neutral dark gray ink and neutral light gray ink, the absorbance ratio of carbon black: cyan pigment: violet pigment for the neutral dark gray ink is 0.06:0.02:0.03 with values being measured at 1/5K dilution, at the peak maxima between 400 nm and 700 nm wavelength for cyan and violet and at 500 nm for carbon black and each ratio value ranging +/−25%;
and the absorbance ratio of carbon black: cyan pigment: violet pigment for the neutral light gray ink is 0.02: 0.01:0.01 with values being measured at 1/5K dilution, at the peak maxima between 400 nm and 700 nm wavelength for cyan and violet and at 500 nm for carbon black and each ratio value ranging +/−25%.

26. The ink set of claim 25 wherein the wavelength of the peak maxima for the cyan of the neutral dark gray ink is 610 to 620 nm.

27. The ink set of claim 25 wherein the wavelength of the peak maxima for the violet of the neutral dark gray ink is 530 to 540 nm.

28. The ink set of claim 25 wherein the wavelength of the peak maxima for the cyan of the neutral light gray ink is 610 to 620 nm.

29. The ink set of claim 25 wherein the wavelength of the peak maxima for the violet of the neutral light gray ink is 530 to 540 nm.

30. The ink set of claim 18, wherein the ink set is a three-ink ink set comprising neutral black ink, neutral dark gray ink, and neutral light gray ink.

31. The ink set of claim 18, wherein the ink set is a six-ink ink set comprising neutral black ink, neutral gray ink for use with neutral light gray ink, neutral light gray ink, cyan ink, magenta ink, and yellow ink.

32. The ink set of claim 18, wherein the ink set is an eight-ink ink set comprising neutral black ink, neutral gray ink for use with neutral light gray ink, neutral light gray ink, cyan ink, magenta ink, yellow ink, light cyan ink and light magenta ink.

33. The ink set of claim 18, wherein the ink set is a twelve-ink ink set comprising neutral black ink, neutral medium gray ink, cyan ink, magenta ink, yellow ink, light cyan ink, light magenta ink, red ink, green ink, blue ink, violet ink, and orange ink.

34. The ink set of claim 18, wherein the violet pigment is selected from the group consisting of PV42, PV23, PV3, PV32, PV36, and PV38.

35. The ink set of claim 18, wherein the violet pigment has a quinacridone or dioxazine based structure.

36. The ink set of claim 18, wherein the carbon black in the neutral black ink is from 1.568 to 2.613 weight percent; the cyan pigment in the neutral black ink is from 0.317 to 0.529 weight percent and comprises PB15:4 cyan pigment; and the violet pigment in the neutral black ink is from 0.438 to 0.731 weight percent and comprises PV23 violet pigment.

37. The ink set of claim 22, wherein the carbon black in the neutral medium gray ink is from 0.314 to 0.523 weight percent carbon black; the cyan pigment is from 0.068 to 0.113 weight percent and comprises PB15:4 cyan pigment;

and the violet ink comprises from 0.101 to 0.169 weight percent and comprises PV23 violet pigment.

38. The ink set of claim 25, wherein the carbon black in the neutral dark gray ink is from 0.517 to 0.862 weight percent; the cyan pigment in the neutral dark gray ink is from 0.105 to 0.174 weight percent and comprises PB15:4 cyan pigment; and the violet pigment in the neutral dark gray ink is from 0.145 to 0.241 weight percent and comprises PV23 violet pigment; and wherein the carbon black in the neutral light gray ink is from 0.172 to 0.287 weight percent; the cyan pigment in the neutral light gray ink is from 0.035 to 0.058 weight percent and comprises PB15:4 cyan pigment; and the violet pigment in the neutral light gray ink is from 0.048 to 0.080 weight percent and comprises PV23 violet pigment.

39. A method of printing gray, black and neutral areas with decreased browning and metamerism in ink-jet printing comprising:

printing on a medium with an ink set of neutral black and at least one ink selected from the group consisting of neutral medium gray ink, neutral dark gray ink, neutral light gray ink, cyan ink, magenta ink, yellow ink, light cyan ink, light magenta ink, red ink, green ink, blue ink, violet ink and orange ink;

wherein the absorbance ratio of carbon black: cyan pigment: violet pigment for the neutral black ink is 0.18: 0.05:0.08 with values being measured at 1/5K dilution, at the peak maxima between 400 nm and 700 nm wavelength for cyan and violet and at 500 nm for carbon black and each ratio value ranging +/−25%;

and wherein the carbon black, cyan pigment and violet pigment are associated with a polymer or polymers which render the carbon black, cyan pigment and violet pigment dispersible in aqueous solution.

40. The method of claim 39 wherein the wavelength of the peak maxima for the cyan of the neutral black ink is 610 to 620 nm.

41. The method of claim 39 wherein the wavelength of the peak maxima for the violet of the neutral black ink is 530 to 540 nm.

42. The method of claim 39, wherein the polymer or polymers are acrylates.

43. The method of claim 39, wherein when the ink-set comprises neutral medium gray ink, the absorbance ratio of carbon black: cyan pigment: violet pigment for the neutral medium gray ink is 0.04:0.01:0.02 with values being measured at 1/5K dilution, at the peak maxima between 400 nm and 700 nm wavelength for cyan and violet and at 500 nm for carbon black wavelength and each ratio value ranging +/−25%.

44. The method of claim 43 wherein the wavelength of the peak maxima for the cyan of the neutral medium gray ink is 610 to 620 nm.

45. The method of claim 43 wherein the wavelength of the peak maxima for the violet of the neutral medium gray ink is 530 to 540 nm.

46. The method of claim 39, wherein when the ink-set comprises neutral dark gray ink and neutral light gray ink, the absorbance ratio of carbon black: cyan pigment: violet pigment for the neutral dark gray ink is 0.06:0.02:0.03 with values being measured at 1/5K dilution, at the peak maxima between 400 nm and 700 nm wavelength for cyan and violet and at 500 nm for carbon black and each ratio value ranging +/−25%;

and the absorbance ratio of carbon black: cyan pigment: violet pigment for the neutral light gray ink is 0.02: 0.01:0.01 with values being measured at 1/5K dilution, 400–700 wavelength and each ratio value ranging +/−25%.

47. The method of claim 46 wherein the wavelength of the peak maxima for the cyan of the neutral dark gray ink is 610 to 620 nm.

48. The method of claim 46 wherein the wavelength of the peak maxima for the violet of the neutral dark gray ink is 530 to 540 nm.

49. The method of claim 46 wherein the wavelength of the peak maxima for the cyan of the neutral light gray ink is 610 to 620 nm.

50. The method of claim 46 wherein the wavelength of the peak maxima for the violet of the neutral light gray ink is 530 to 540 nm.

51. The method of claim 39, wherein the ink set is a three-ink ink set comprising neutral black ink, neutral dark gray ink, and neutral light gray ink.

52. The method of claim 39, wherein the ink set is a six-ink ink set comprising neutral black ink, neutral dark gray ink, neutral light gray ink, cyan ink, magenta ink, and yellow ink.

53. The method of claim 39, wherein the ink set is an eight-ink ink set comprising neutral black ink, neutral dark gray ink, neutral light gray ink, cyan ink, magenta ink, yellow ink, light cyan ink and light magenta ink.

54. The method of claim 39, wherein the ink set is a twelve-ink ink set comprising neutral black ink, neutral medium gray ink, cyan ink, magenta ink, yellow ink, light cyan ink, light magenta ink, red ink, green ink, blue ink, violet ink, and orange ink.

55. The method of claim 39, wherein the violet pigment is selected from the group consisting of PV19, PV42, PV23, PV3, PV19, PV32, PV36, and PV38.

56. The method of claim 39, wherein the violet has a quinacridone or dioxazine based structure.

57. The method of claim 39, wherein the carbon black in the neutral black ink is from 1.568 to 2.613 weight percent; the cyan pigment in the neutral black ink is from 0.317 to 0.529 weight percent and comprises PB15:4 cyan pigment; and violet pigment in the neutral black ink is from 0.438 to 0.731 weight percent and comprises PV23 violet pigment.

58. The method of claim 43, wherein the carbon black in the neutral medium gray ink is from 0.314 to 0.523 weight percent; the cyan pigment is from 0.068 to 0.113 weight percent and comprises PB15:4 cyan pigment; and the violet pigment is from 0.101 to 0.169 weight percent and comprises PV23 violet pigment.

59. The method of claim 46, wherein the carbon black in the neutral dark gray ink is from 0.517 to 0.862 weight percent; the cyan pigment in the neutral dark gray ink is from 0.105 to 0.174 weight percent and comprises PB15:4 cyan pigment; and the violet pigment in the neutral dark gray ink is is from 0.145 to 0.241 weight percent violet pigment; and wherein the carbon black in the neutral light gray ink is from 0.172 to 0.287 weight percent; the cyan pigment in the neutral light gray ink is from 0.035 to 0.058 weight percent and comprises PB15:4 cyan pigment; and the violet pigment in the neutral light gray ink is from 0.048 to 0.080 weight percent and comprises PV23 violet pigment.

* * * * *